United States Patent
Agarwal (10) Patent No.: US 9,363,631 B2
(45) Date of Patent: Jun. 7, 2016

(54) METHODS, SYSTEMS, AND COMPUTER READABLE MEDIA FOR TRIGGERLESS CENTRALIZED LOCATION SERVER

(71) Applicant: Tekelec Global, Inc., Morrisville, NC (US)

(72) Inventor: Devesh Agarwal, Cary, NC (US)

(73) Assignee: Tekelec Global, Inc., Morrisville, NC (US)

( * ) Notice: Subject to any disclaimer, the term of this patent is extended or adjusted under 35 U.S.C. 154(b) by 0 days.

(21) Appl. No.: 14/215,696

(22) Filed: Mar. 17, 2014

(65) Prior Publication Data

US 2014/0287747 A1    Sep. 25, 2014

Related U.S. Application Data

(60) Provisional application No. 61/791,607, filed on Mar. 15, 2013.

(51) Int. Cl.
| | | |
|---|---|---|
| *H04W 4/00* | (2009.01) | |
| *H04W 4/02* | (2009.01) | |
| *H04W 4/20* | (2009.01) | |

(52) U.S. Cl.
CPC . *H04W 4/02* (2013.01); *H04W 4/20* (2013.01)

(58) Field of Classification Search
CPC .................................. H04W 4/02; H04W 4/20
USPC ............................ 455/433, 445, 456.1, 456.2
See application file for complete search history.

(56) References Cited

U.S. PATENT DOCUMENTS

| | | | |
|---|---|---|---|
| 6,735,441 | B1 | 5/2004 | Turgeon et al. |
| 7,222,192 | B2 | 5/2007 | Allison et al. |
| 8,750,292 | B2 | 6/2014 | Agarwal et al. |
| 8,761,764 | B2 | 6/2014 | Mccann et al. |
| 9,021,014 | B2 | 4/2015 | Agarwal et al. |
| 9,100,796 | B2 | 8/2015 | Marsico |
| 2010/0029272 | A1* | 2/2010 | McCann et al. ............... 455/433 |

OTHER PUBLICATIONS

"3rd Generation Partnership Project; Technical Specification Group Services and System Aspects; Intra-domain connection of Radio Access Network (RAN) nodes to multiple Core Network (CN) nodes (Release 11)," 3GPP TS 23.236, V11.0.0, pp. 1-40 (Sep. 2012).

* cited by examiner

*Primary Examiner* — Amancio Gonzalez
(74) *Attorney, Agent, or Firm* — Jenkins, Wilson, Taylor & Hunt, P.A.

(57) ABSTRACT

Methods, systems, and computer readable media for providing a triggerless centralized location server are disclosed. According to one aspect, a system for providing a triggerless centralized location server includes multiple signaling message routing nodes configured to operate in a telecommunications network. Each routing node is configured to receive a signaling message having an intended destination, determine whether the received signaling message includes location information related to a subscriber, and, if so, extract the location information related to the subscriber, route the signaling message to the intended destination, and store the location information related to the subscriber in a centralized location database. The centralized location database is configured to receive a request for location information associated with a subscriber, and, in response to receiving the request, retrieve the location information associated with the subscriber from the database and provide the retrieved location information in response to the request.

17 Claims, 5 Drawing Sheets

METHODS, SYSTEMS, AND COMPUTER READABLE MEDIA FOR TRIGGERLESS CENTRALIZED LOCATION SERVER

PRIORITY CLAIM

This application claims the benefit of U.S. Provisional Patent Application Ser. No. 61/791,607, filed Mar. 15, 2013; the disclosure of which is incorporated herein by reference in its entirety.

TECHNICAL FIELD

The subject matter described herein relates to methods and systems for providing mobile subscriber location information in an telecommunications network. More particularly, the subject matter described herein relates to methods, systems, and computer readable media for triggerless centralized location server.

BACKGROUND

Third generation (3G) mobile networks include at least one entity known as a home location register, or HLR. One of the duties of an HLR is to keep track of the location of mobile subscribers. Information about a subscriber's current location is typically maintained in a database on the HLR. Each HLR typically maintains information for a large number of subscribers, e.g., hundreds of thousands to millions of subscribers. For example, if each HLR can store information for ten million subscribers, a network operator having eighty million subscribers would therefore need about eight HLRs. HLRs provide subscriber location information in response to receiving a subscriber location query from another node in the network, such as a mobile switching center (MSC). For example, when an MSC receives a request to set up a call between the calling party and a mobile subscriber, the MSC must first determine the current location of the mobile subscriber in order to route the call setup request to the network equipment currently serving that subscriber, which the MSC does by sending a query to the HLR. If the network has multiple HLRs, the MSC needs to send the query to the correct HLR, i.e., to the HLR that maintains information for the particular mobile subscriber that the calling party is trying to reach.

Telecommunications networks that use system signaling 7 (SS7) for network signaling typically have one or more signaling transfer points, or STPs, for routing signaling messages related to call setup, registration of a device to the network, location updates, and so on. As a nexus of signaling traffic, STPs are well-placed to make routing decisions based on, for example, subscriber identities. Thus, the MSC may be provisioned to send all location queries to the nearest STP and let the STP figure out which HLR should receive that particular query.

In conventional telecommunications networks, an STP may access multiple HLRs, but HLRs are typically not shared among STPs. As a result, subscriber location information is distributed across the network in one of the potentially many HLRs in the system. When the location of a subscriber needs to be determined, the STP must first identify which of the many HLRs maintains that subscriber's information before routing the location query to that HLR. If the subscriber's information is not contained in any of the HLRs that the STP is associated with, the STP may need to forward the location query to another STP, which may forward the query to yet another STP, and so on, until it gets to the STP that is associated with the HLR that contains the subscriber's current location. Only then can the proper HLR be queried, and the query result must be sent back through the network until it is received by the MSC that sent the original query. This multi-step process is cumbersome and inefficient.

Accordingly, there exists a need for a centralized repository that stores current location information for all mobile subscribers in a telecommunications network. Furthermore, such a centralized repository should be able to be dynamically updated using information from a multitude of sources, such as the nodes which report changes in a mobile subscriber's location and/or signaling routing nodes that route this information throughout the network. In short, there exists a need for methods, systems, and computer readable media for providing a triggerless centralized location server.

SUMMARY

According to one aspect, a system for providing a triggerless centralized location server includes a signaling message routing node in a telecommunications network for receiving a signaling message having an intended destination, the message including location information related to a subscriber, and, in response to receiving the signaling message, extracting the location information related to the subscriber, routing the signaling message to the intended destination, and storing the location information related to the subscriber in a centralized location database, wherein the centralized location database receives a request for location information associated with a subscriber, and, in response to receiving the request, retrieves the location information associated with the subscriber from the database and provides the retrieved location information in response to the request.

According to another aspect, the subject matter described herein includes a method for providing a triggerless centralized location server. A signaling message routing node in a telecommunications network receives a signaling message having an intended destination, the message including location information related to a subscriber, and, in response to receiving the signaling message, extracts the location information related to the subscriber, routes the signaling message to intended destination, and stores the location information related to the subscriber in a centralized location database. The centralized location database receives a request for location information associated with a subscriber, and, in response to receiving the request, retrieves the location information associated with the subscriber from the database and provides the retrieved location information in response to the request.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for providing a triggerless centralized location server are provided. Reference will now be made in detail to exemplary embodiments of the present invention, examples of which are illustrated in the accompanying drawings. Wherever possible, the same reference numbers will be used throughout the drawings to refer to the same or like parts.

Figure 1:
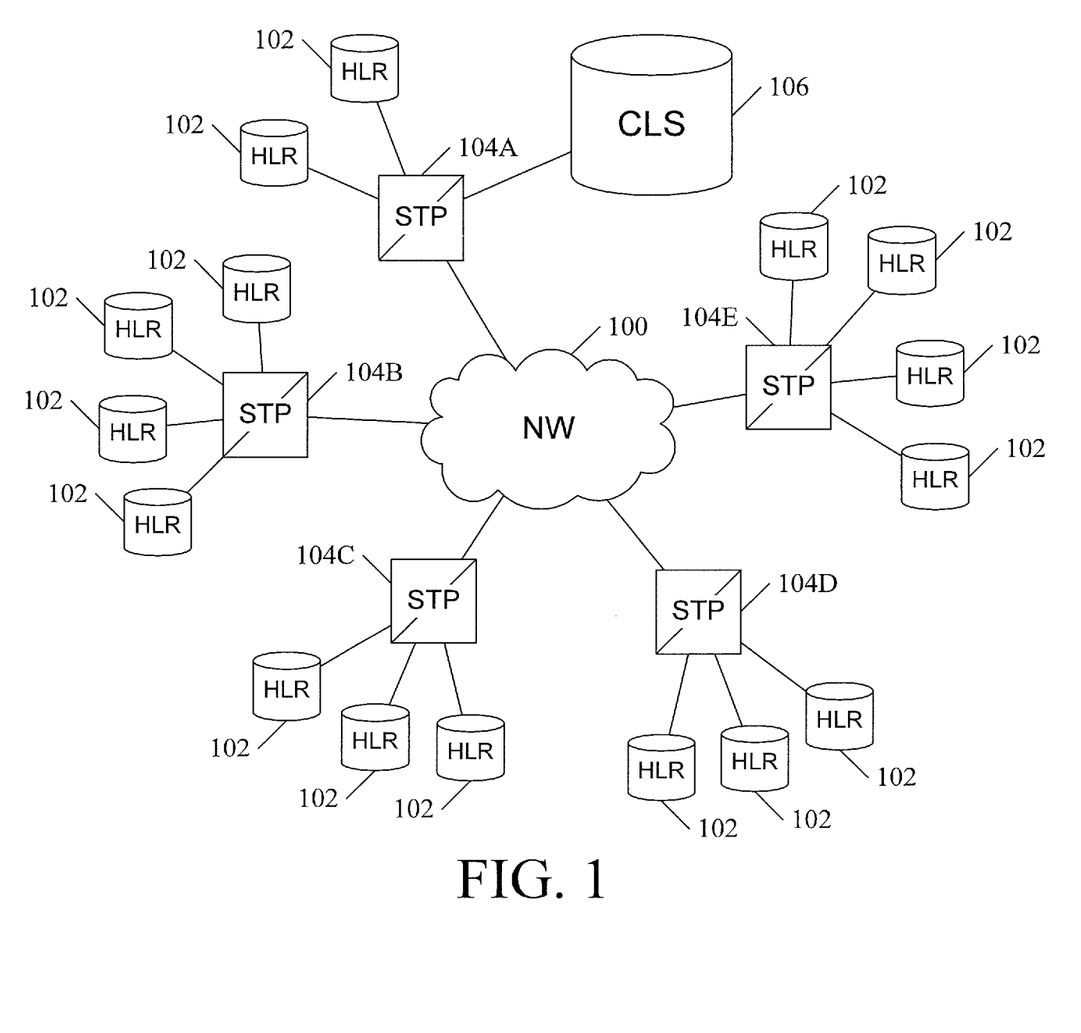
FIG. 1 is a block diagram illustrating an exemplary system for providing a triggerless centralized location server according to an embodiment of the subject matter described herein.

FIG. 1 is a block diagram illustrating an exemplary system for providing a triggerless centralized location server according to an embodiment of the subject matter described herein. In the embodiment illustrated in FIG. 1, telecommunications network 100 includes a number of HLRs 102 for storing mobile subscriber location information. Network 100 also includes several STPs (104A, 104B, 104C, 104D, and 104E, herein collectively referred to as "STP 104") for routing signaling messages within network 100. Each STP 104 may be associated with one or more HLRs 102. In the embodiment illustrated in FIG. 1, each STP 104 is associated with two, three, or four HLRs 102.

A centralized location server (CLS) 106 provides a repository for subscriber location information which may be queried by other nodes in network 100 to determine the current location of any mobile subscriber, regardless of which HLR 102 stores that particular mobile subscriber's information. In the embodiment illustrated in FIG. 1, CLS 106 is associated with one of the STPs 102, i.e. STP 104A. In this embodiment, as each STP 102 in network 100 receives or intercepts a signaling message containing location information for a subscriber, that STP forwards the signaling message to the proper HLR 102 but also sends subscriber location information, e.g., as a copy of the original signaling message or as a new message containing the subscriber location information that was extracted from the original signaling message, to STP 104A, which sends the subscriber location information to CLS 106 for storage. CLS 106 may then be queried for the latest location information for any subscriber currently known to the network.

The same concepts may be applied to non-3G networks as well. For example, network 100 may be a Diameter network, signal routing nodes 104 may be Diameter signaling routers (DSRs), and the nodes 102 that store subscriber location information may be home subscriber servers (HSSs).

Figure 2:
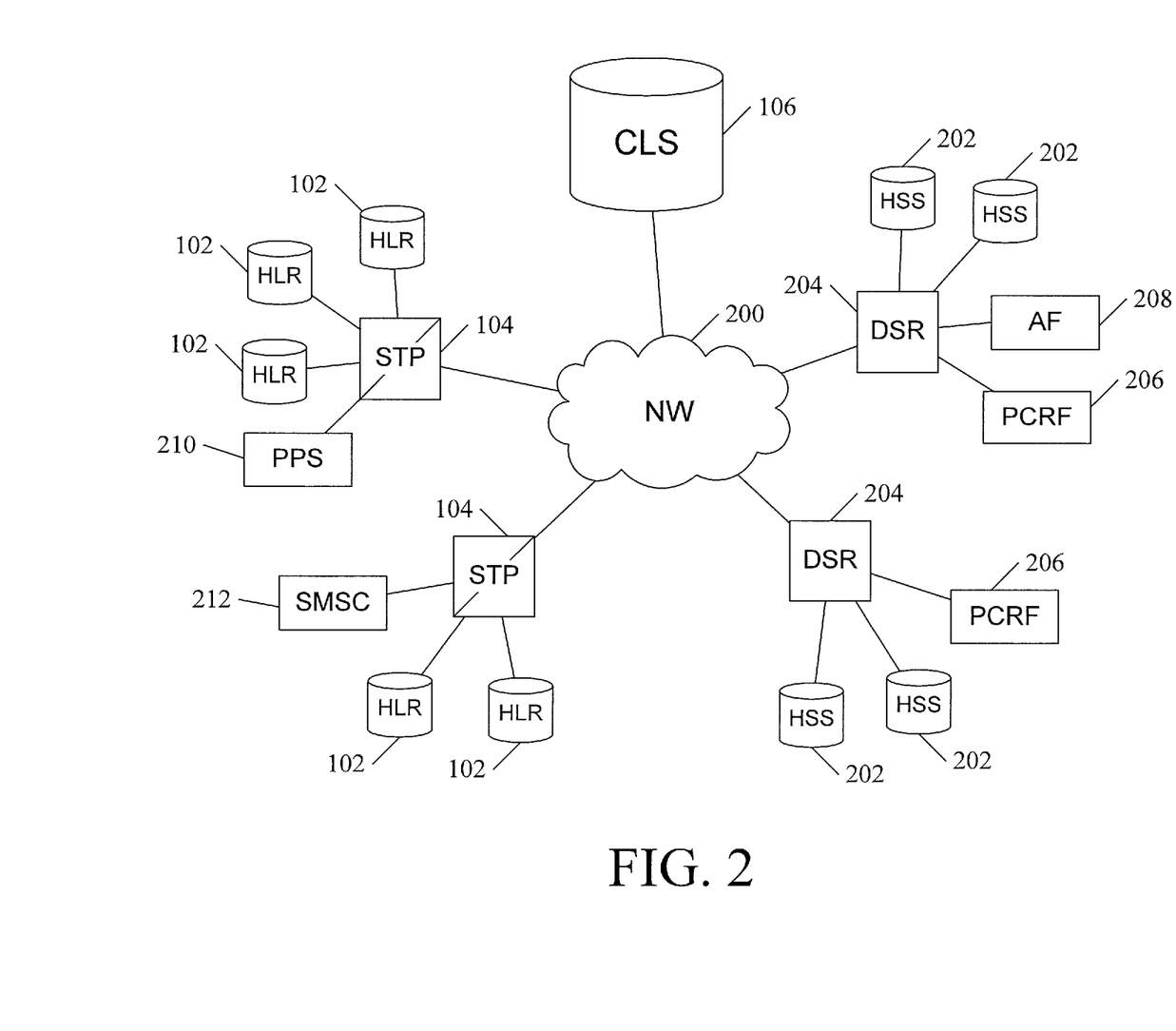
FIG. 2 is a block diagram illustrating an exemplary system for providing a triggerless centralized location server according to another embodiment of the subject matter described herein.

FIG. 2 is a block diagram illustrating an exemplary system for providing a triggerless centralized location server 106 according to another embodiment of the subject matter described herein. In the embodiment illustrated in FIG. 2, network 200 supports both 3G and 4G mobile phones, and includes not only HLRs 102 and STPs 104 but also home subscriber servers HSS 202, Diameter signaling routers DSR 204, and other nodes such as policy and charging rules functions PCRF 206, application functions AF 208, prepaid subscriber functions PPS 210, short message service centers SMSC 212, and the like. In the embodiment illustrated in FIG. 2, a CLS 106 is present in the network, but not tied to a particular STP 104 or DSR 204.

CLS 106 may receive subscriber location updates from many sources, including MSCs, call/setup control functions (CSCFs), STPs 104, DSRs 204, and the like. In one embodiment, each STP 104 in network 200 may be configured to send subscriber location information to CLS 106 in response to receiving or intercepting SS7 signaling messages containing such information. Each DSR 204 may be configured to perform a like function in response to receiving or intercepting a Diameter signaling message containing such information.

Figure 3A:
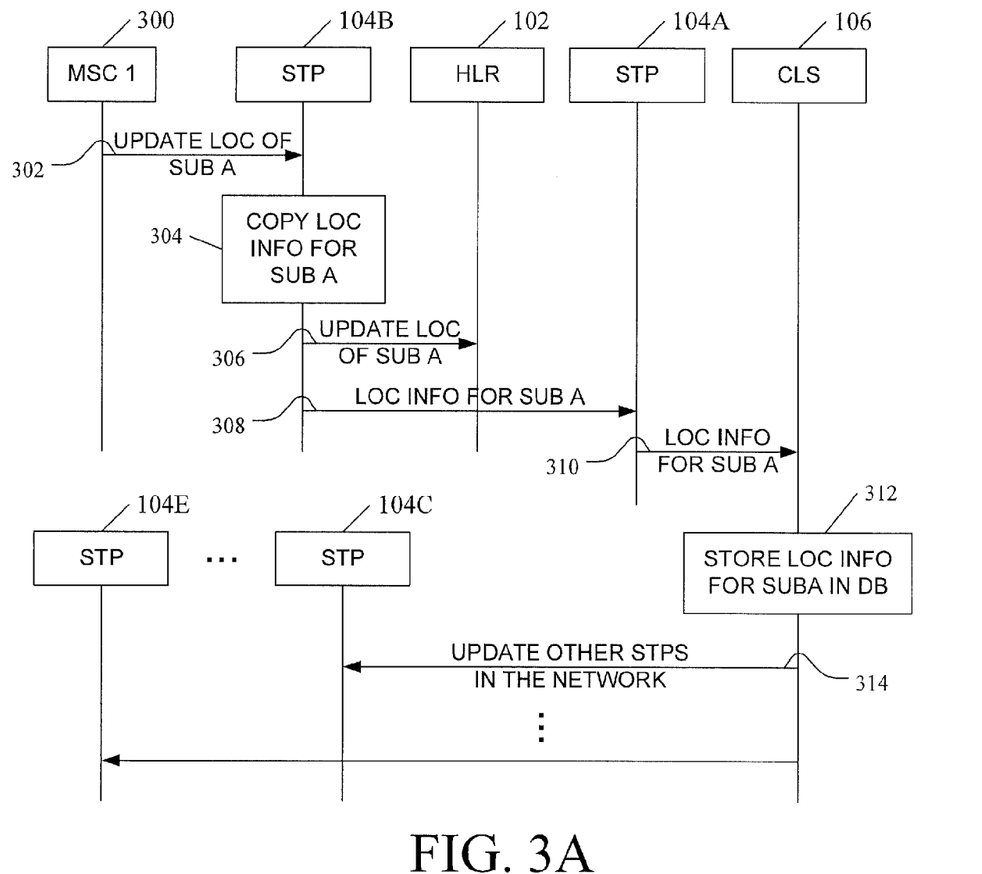
FIGS. 3A and 3B are signaling message flow diagrams illustrating exemplary messages communicated to and from a centralized location server according to an embodiment of the subject matter described herein.
Figure 3B:
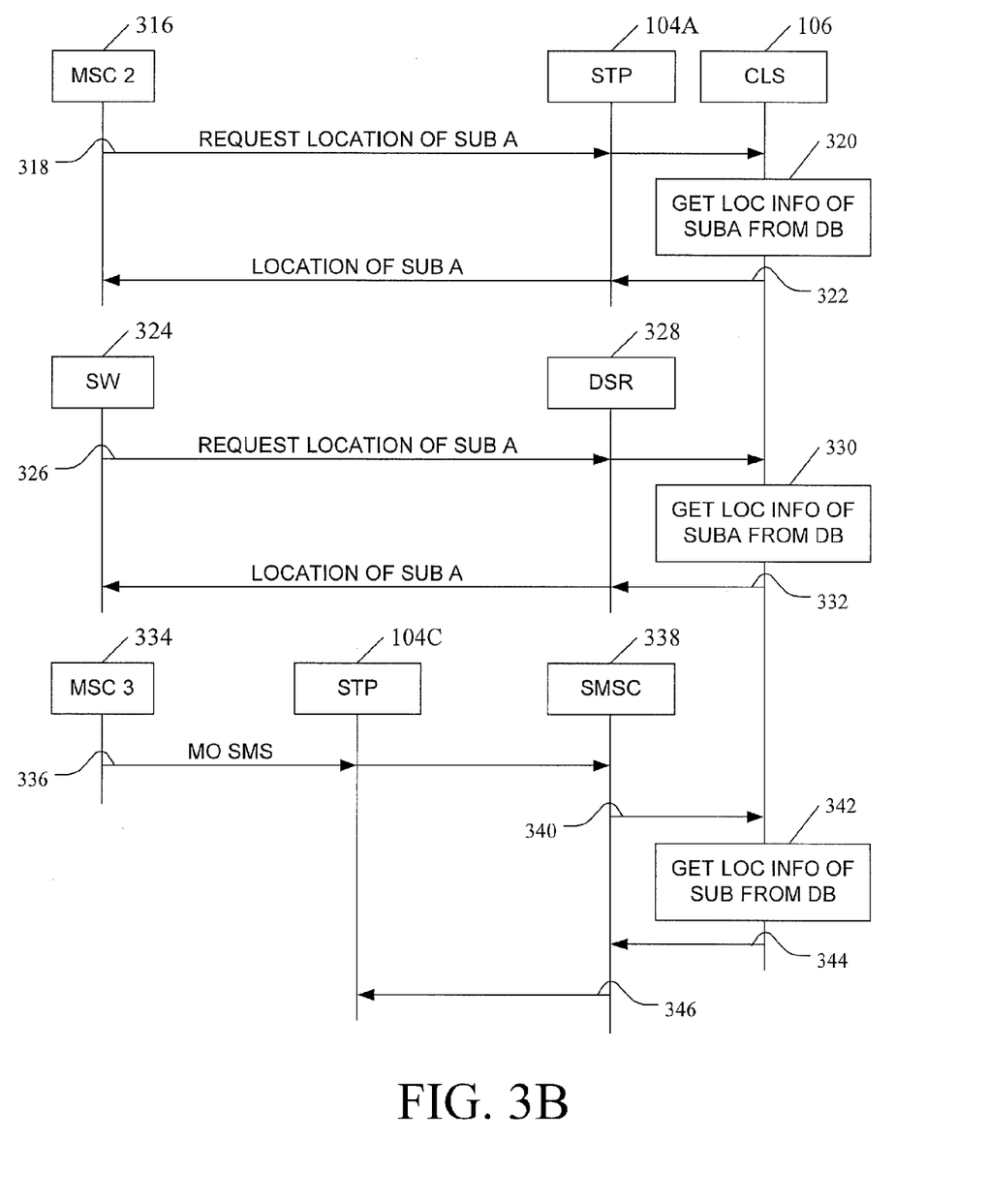

FIGS. 3A and 3B are signaling message flow diagrams illustrating exemplary messages communicated to and from a centralized location server according to an embodiment of the subject matter described herein. FIG. 3A illustrates an example communication between a first MSC 300, an HLR 102, a pair of STPs 104A and 104B, and a CLS 106. The process starts when MSC 1 300 sends a message 302 to notify HLR 102 that the location of a subscriber, herein referred to as "subscriber A", has changed. In one embodiment message 302 may be an Update Location message that contains information indicating the current location of subscriber A. Message 302 is routed through one STP 104B, which determines that message 302 contains location information and therefore copies the location information (block 304), before forwarding the message 306 to the intended destination HLR 102.

In addition, STP 104B sends the extracted location information to STP 104A, which has been configured with the CLS database. This is shown as message 308, which may be a copy of the message 302 or 306, a new message that contains the location information for subscriber A, or other form of communication. STP 104A receives message 308 and sends subscriber A's location information to CLS 106 (message 310), where the location information is stored into a database (block 312.)

In one embodiment, CLS 106 may distribute any information that it maintains out to other nodes in the network. In the embodiment illustrated in FIG. 3A, for example, CLS 106 may send location update information messages 314 to STPs 104C through 104E, which those STPs may store in a database for their subsequent use. In one embodiment, for example, subscriber routing database (SRDB) fields may be added for storing information, such as CellID information from an MSC attach/location update, that may be provided by CLS 106.

FIG. 3B illustrates how the information maintained by CLS 106 may be used by nodes in the network. When any node in the network needs to know the location of subscriber A, they can query CLS 106 to get that information. In the embodiment illustrated in FIG. 3B, for example, the second MSC 316 sends a message 318 that requests the location of subscriber A. Message 318 is received by STP 104A, which forwards the message to CLS 106 or creates a new request which it sends to CLS 106. In response to receiving the request for subscriber A's location, CLS 106 retrieves that information from the database (block 320), and sends a response 322 containing the location information for subscriber A. In the embodiment illustrated in FIG. 3A, CLS 106 sends the response 322 to STP 104A, which forwards that information to second MSC 316.

FIG. 3B also illustrates the feature that CLS 106 may be accessed by multiple networks, network types, or network operators. For example, in the embodiment illustrated in FIG. 3B, a switch in a 4G network, SW 324, may issue a Diameter message 326 requesting the location of subscriber A. Message 326 is received by a diameter signaling router DSR 328, which forwards the request to CLS 106 or generates a new request which is sent to CLS 106. In response, CLS 106 queries the location info database (block 330), retrieves the current location of subscriber A, and sends that information back to the source of the request (message 332.)

FIG. 3B also illustrates the feature that CLS 106 is useful for routing SMS messages. In the embodiment illustrated in FIG. 3B, a third MSC 334 sends a mobile originated (MO) SMS message 336 to STP 104C, which forwards the message to the appropriate SMSC 338. SMSC 338 may query CLS 106 to determine the location of the intended recipient (message 340.) In response to receiving the query, CLS 106 gets the location information for the subscriber (block 342) and sends that information to SMSC 338 via message 344. SMSC 338 may then route the SMS message "on-network" via a store and forward process to STP 104C, as shown in FIG. 3B, or it may route the SMS "off-network" to another network SMSC (not shown.)

In one embodiment, location update notifications that occur within the 4G network may trigger subscriber location information to be sent from nodes within the 4G network to CLS 106 in a manner similar to that described for the 3G network. For example, DSR 328 and other DSRs within the network may be configured to detect location update messages that they receive and send subscriber location information to CLS 106, either by extracting the subscriber location information from the received messages and sending that information to CLS 106, sending copies of the received messages to CLS 106, and the like.

One advantage to the embodiments of systems shown in FIGS. 1 and 2, for example, are that subscriber location information can be collected and supplied to CLS 106 without requiring the use of taps on the signaling lines, which are expensive and which provide additional points of possible failure. Furthermore, the systems and methods described herein can be implemented using existing protocols if desired, but may also be implemented using extensions of standard protocols where that is appropriate. In the embodiment illustrated in FIG. 1, for example, each STP 104 may be configured to send copies of location update messages both to the target HLR 102 and to CLS 106 either directly (e.g., addressed to the CLS itself, if the CLS is a standalone node with its own address), indirectly (e.g., addressed to the STP that is hosting the CLS database, if that is the case), or via next-hop routing protocols (e.g., STP 104C would forward location information to STP 104B, which would forward it to STP 104A.)

In contrast to the inefficiencies of current systems, which suffer the disadvantage that before you can locate a subscriber you must first locate the HLR that holds the location of that subscriber, the presence of CLS 106 means that whenever a node needs subscriber location information, that node always knows where to go to get it—namely, CLS 106. This simplifies (or at least does not make any more complicated) the process of storing the updated location information, because every source of location updates knows where to send that information, i.e., CLS 106.

The subject matter described herein is not limited to storing location information only. The same principles may be applied to the collection of other information that may benefit from centralization, such as specific information about a subscriber to which a particular node for function would benefit from having easy access.

Figure 4:
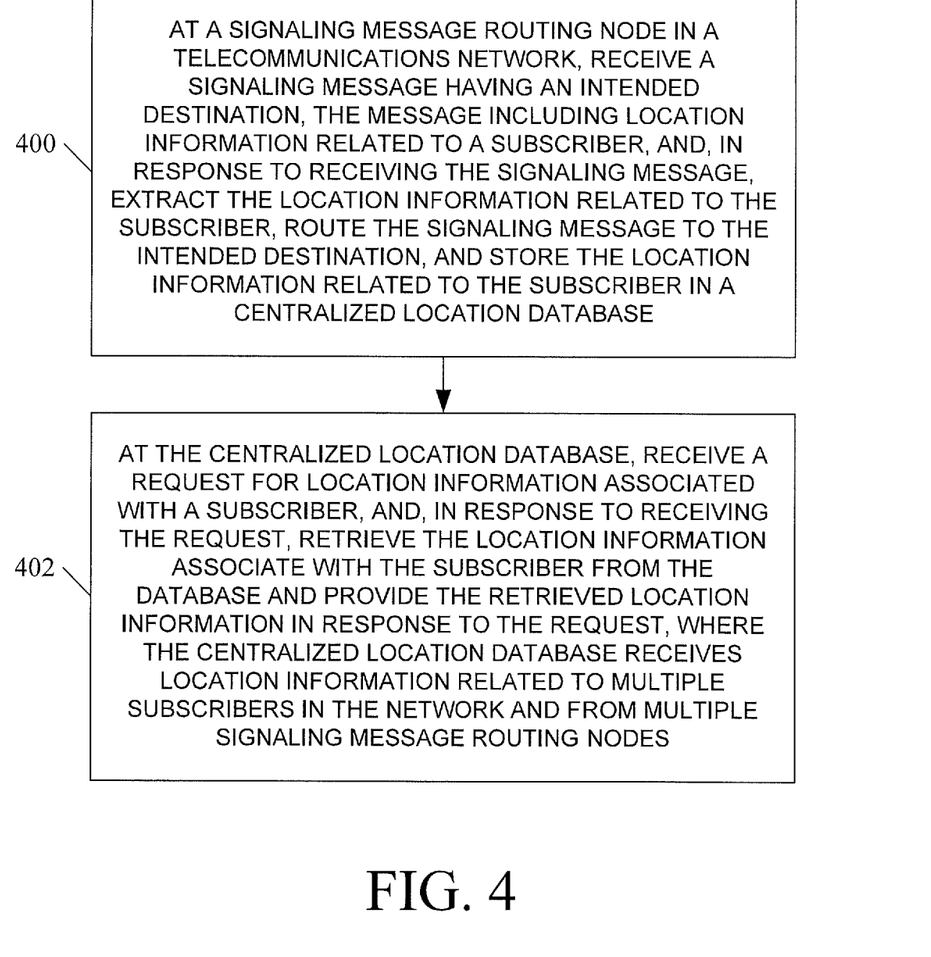
FIG. 4 is a flow chart illustrating an exemplary process for providing a triggerless centralized location server according to an embodiment of the subject matter described herein.

FIG. 4 is a flow chart illustrating an exemplary process for providing a triggerless centralized location server according to an embodiment of the subject matter described herein. In the embodiment illustrated in FIG. 4, at step 400, a signaling message routing node in a telecommunications network receives a signaling message having an intended destination, the message including location information related to a subscriber, and, in response to receiving the signaling message, extracts the location information related to the subscriber, routes the signaling message to the intended destination, and stores the location information related to the subscriber in a centralized location database. At step 402, the centralized location database receives a request for location information associated with a subscriber, and, in response to receiving the request, retrieves the location information associated with the subscriber from the database and provides the retrieved location information in response to the request. The centralized location database receives location information related to multiple subscribers in the network and from multiple signaling message routing nodes.

Systems and methods according to the subject matter described herein can provide the location of every wireless subscriber, including both on-network and roaming subscribers, without any impact on SS7 signaling methodology. For example, standard call setup messages (e.g., R2, ISUP, BICC, SIP) may be used. Signaling traffic may or may not increase, depending on the granularity of information desired. For example, MSC-level granularity does not increase network signaling traffic, while for BSC/RNC level granularity, signaling traffic to the STP increases but is filtered at the STP. Thus, the systems and methods described herein provide a non-intrusive solution without impact on message routing, and may be deployed on top of existing solutions with minimal changes in hardware or software. One modification to existing network configuration, for example, is to modify the behavior of MSCs or other nodes that communicate with an STP so that the MSCs pass all attach/location updates to the STP, not just the first one, as is commonly configured.

Not only may location information be shared with any number of nodes or applications, but that information may be combined with other types of information to provide enhanced services or content. In one embodiment, for example, location information may be combined with mobile status for instant messaging clients. On the IM client, the user may control his or her profile to show or hide current mobile status/current location. Network operators may also use the information stored in CLS 106 to get an instantaneous, real-time snapshot of the location and/or status of all of their subscribers, whether the subscribers are on network or roaming.

Table 1 lists examples of the kinds of data that may be stored on CLS 106 and the applications or features that could make use of that data.

TABLE 1

| Feature | Input Key | | | | | | | Data Output | | | | | | | | | |
|---|---|---|---|---|---|---|---|---|---|---|---|---|---|---|---|---|---|
| | DN | IMSI | IMEI | LRN | ST | PT | PP | HLR | RN | VMA | SMSC | NAPTR | RC | CP | STR | CdPN | CgPN |
| ENUM | ✓ | | | | | | | | | | | ✓ | | | | | |
| NA LNP | ✓ | | | ✓ | ✓ | | | | | | | | | | | | |
| ITU NP | ✓ | | | ✓ | | ✓ | ✓ | | | | | ✓ | | | | | |
| HLR Router | ✓ | ✓ | | ✓ | | | | | | | | | | | | | |
| Voice Mail Router | ✓ | | | | | | | | | ✓ | | | | | | | |
| SMS Router | ✓ | | | ✓ | | | | | | ✓ | ✓ | | | | | | |
| EIR | ✓ | ✓ | ✓ | | | | | | | | | | ✓ | | | | |
| Equal Access | ✓ | | | | | | | | | | | | | | | ✓ | |
| Number Subs | ✓ | | | | | | | | | | | | | | | ✓ | ✓ |
| IS41GSM | ✓ | | | | | | | ✓ | | | | | | | | | |
| Prepaid Router | ✓ | | | | | ✓ | | | | | | | | | | | |

(DN = Directory Number, SMS = Short Message Service, VMA = Voice Mail Address, ST = Subscriber Type, RC = Release Cause, PT = Portability Type, RN = Routing Number, CP = Call Permissions, PP = Prepaid ID).

Other types of information may be stored within CLS 106. For example, CLS 106 may also operate as a global identity database for storing a universal identifier for each subscriber. Telephony presence may be derived from information supplied by other network elements. Other domains may have presence interfaces for subscription to presence updates. Datafill for non-telephony domain and userid information may be facilitated through automated gathering agents currently used by most major web services. Subscribers may have multiple domain and userid combinations, but telephony domain is the most consistent element. By operating as a global identity database, CLS 106 may provide linkage across domains with user controls, which enables intelligent communication, e.g., communication with a particular subscriber according to that subscriber's preferred method of communication (text, voice, email, etc.) without forcing agreed communication methodologies. CLS 106 need only be provided with one contact UserID in order to contact another individual according to that individual's preference. Contact information is not distributed, and user preferences for communication are not forced on other individuals—each subscriber may communicate according to their particular preference. Thus, in one embodiment, CLS 106 may provide a user interface so that subscribers may define their preferred methods of communication in order, for example.

Another type of information that may be stored within CLS 106 is information that may be used to monitor applications and their load, current performance, and quality of service (QoS) levels being provided to subscribers. Because STPs are the locus of a large amount and large number of types of traffic, they are in a unique position to monitor and forward all types of data to CLS 106, including the application monitoring information just described. As stated above, however, the principles described herein are not limited to just SS7 networks and traffic, but may be applied to other types of networks, including Diameter networks, and may be supplied with data from nodes other than STPs. In 3G networks, for example, the SGSN is in a similarly advantageous position in the network topology. In one embodiment, SGSNs can provide information to CLS 106. Non-SS7 data can also be captured via network probes, integrated feeds, and software probes.

Yet other types of information that may be maintained within CLS 106 include what may be referred to as "subscriber intelligence", such as: perceived quality of experience (QoE) for voice and data transactions—real time mean opinion score (MOS); radio performance during a call or session; handset usage and performance for applications, gaming, failures/lockups, network access failures, dead-zones, on device portal, and others; and current application usage statistics without requiring deep packet inspection (DPI) to determine traffic types. In one embodiment, CLS 106 can receive and store information provided by nodes within the radio access network (RAN) such as BSS and UTRAN. For example, an STP located between a BSC and an MSC can offload SMS messages based on location information provided by CLS 106.

Service provider data usage is also a candidate for inclusion within data maintained by CLS 106. Such data may provide more detailed visibility into customer trouble reporting and troubleshooting (e.g. turn on detailed reporting for targeted subscribers or network areas for problem resolution), enable proactive behavioral network analysis, enable policy engines to support QoE tiering and customized services or enforce acceptable policy controls and ensure network QoS. CLS 106 may be a source of improved data for marketing and planning (comprehensive views to device/access/service usage, access failures, device types, and demographic analysis), may enable revenue generating applications either within the service provider or with 3rd party application providers (supports Web 2.0 and Telco 2.0 industry efforts), and may provide subscriber/network behavior information to refine operational support and targeted advertising.

Integrated applications solutions (IAS) information may also be stored within CLS 106. For example, when a call or session is initiated on a mobile device, a software agent (SA) on the device may report information such as MOS, radio key performance indicators (KPIs), etc., which may be aggregated within CLS 106. Such information can be used to generate comprehensive reports on the health of the network, which may be organized by devices or segmented by user group, by radio and core networks, by content and services, and the like. Operators may use IAS information for call/session tracing, alarm management, or other valuable functions. The types and quality of such information is limited only by the capabilities of the software agent itself. SA-provided information about MOS, for example, is more accurate and cost efficient than probe based MOS. Information provided by SAs can also include information that is not directly network-related, and may include information such as subscriber habits and preferences.

Such information can dramatically increase the value of IAS data and reports, by providing user quality perceived KPIs and radio network conditions KPIs, providing end-point real life/traffic reports, increasing visibility to non-network data (e.g., on device application usage—gaming, portal, etc. . . . ), and extending visibility to application usage before encryption and obfuscation, thereby reducing the unidentified traffic component of existing monitoring systems, which has accounted for as much as 60% of mobile computer traffic and 10% of mobile handheld device traffic in some studies. IAS data can provide selective end-user monitoring capabilities (e.g. segmented for VIP, Corporate, Blackberry subscriptions, iPhone subscriptions, individuals, etc. ... ), can recognize and prepare for competition from end point monitoring companies, and can reduce data acquisition costs in a business model.

There are a number of applications that can take advantage of the location information stored within CLS 106. One such application is the ability to guarantee sufficient wireless network availability for emergency responders. During emergency situations, peak periods of use, or other service factors, there is often a need for operators to prioritize traffic and provide additional traffic control. Since all mobile registrations traverse and STP, this provides the opportunity to enhance traffic control through subscriber categorization. For example, a subscriber category can be implemented within CLS 106 and/or the STPs. In one embodiment, subscribers may be categorized as an emergency responder, a government official, or other person having priority to communication resources during an emergency. Subscribers may also be categorized by type of equipment, such as iPhone, Blackberry, and so on. When required for additional traffic control, an application on the STP can be utilized to prioritize traffic, e.g. by allowing only subscribers above a particular level or included in particular categories receive priority or by allowing only subscribers above a particular level to utilize the network, for example. The STP can control how these restrictions should be applied to specific MSC(s) and/or activated for a defined time period. The STP may be controlled or informed by information about the subscribers stored within CLS 106.

Because CLS 106 maintains location information, the information stored within CLS 106 may be used to get a snapshot of an emergency situation, e.g., how many people are in the affected area, how many emergency responders, law enforcement officials, or government officials are in the area, and so on, and also manipulate subscriber permissions to ensure that qualified personnel have priority to communication resources, which are likely to be flooded with call or session requests.

Because CLS 106 includes location information for multiple subscribers across multiple networks, the information maintained by CLS 106 makes it possible to enforce a level of roaming control that is conventionally not available to any particular network operator. For example, information stored within CLS 106 may be used to enforce some level of roaming control based on a location update coming from foreign network, e.g., an STP can decide if the location update is permitted based on CCP, GSM location update, linkset, SCCP calling party address, or other information. This effectively allows control over whether a subscriber can or cannot roam and/or whether roaming is permitted for a specific network.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for providing a triggerless centralized location server, the system comprising:
   a plurality of signaling message routing nodes configured to operate in a telecommunications network, wherein each of the plurality of signaling message routing nodes is configured to route messages to one or more of a plurality of home location registers (HLRs) and/or home subscriber servers (HSSs), wherein each of the plurality of signaling message routing nodes is configured to receive a signaling message having an intended destination, determine whether the received signaling message includes location information related to a subscriber, and, in response to a determination that the received signaling message includes location information related to a subscriber, extract the location information related to the subscriber, route the signaling message to the intended destination, and store the location information related to the subscriber in a centralized location database,
   wherein the centralized location database is configured to receive a request for location information associated with a subscriber, and, in response to receiving the request, retrieve the location information associated with the subscriber from the database and provide the retrieved location information in response to the request, wherein the centralized location database receives location information related to a plurality of subscribers in the network and from a plurality of signaling message routing nodes, wherein the plurality of subscribers are associated with the plurality of HLRs and/or HSSs, wherein the centralized location database provides the location information regardless of which HLR or HSS among the plurality of HLRs and/or HSSs is associated with the subscriber.

2. The system of claim 1 wherein each of the signaling message routing nodes comprises a signaling transfer point (STP) or a Diameter signaling router (DSR).

3. The system of claim 1 wherein the received signaling message comprises a location update message.

4. The system of claim 3 wherein the intended destination of the received signaling message comprises an HLR or an HSS.

5. The system of claim 1 wherein storing the location information related to the subscriber in a centralized location database comprises storing the information in a database co-located with or hosted by one of the signaling message routing nodes.

6. The system of claim 1 wherein storing the location information related to the subscriber in a centralized location database comprises sending the information to a database that is not co-located with or hosted by one of the signaling message routing nodes.

7. The system of claim 1 wherein the location information related to a subscriber comprises at least one of:
   a geographical location of the subscriber's user equipment; and
   an identity or geographical location of a node providing network access to the subscriber's user equipment.

8. The system of claim 1 wherein the request for location information associated with a subscriber is sent by a mobile switching center (MSC) or a call/session control function (CSCF).

9. A method for providing a triggerless centralized location server, the method comprising:
   at a signaling message routing node in a telecommunications network, wherein the signaling message routing node is configured to route messages to one or more of a plurality of home location registers (HLRs) and/or home subscriber servers (HSSs): receiving a signaling message having an intended destination, the message including location information related to a subscriber, and, in response to receiving the signaling message, extracting the location information related to the subscriber, routing the signaling message to the intended destination, and storing the location information related to the subscriber in a centralized location database;

at the centralized location database: receiving a request for location information associated with a subscriber, and, in response to receiving the request, retrieving the location information associated with the subscriber from the database and providing the retrieved location information in response to the request, wherein the centralized location database receives location information related to a plurality of subscribers in the network and from a plurality of signaling message routing nodes, wherein the plurality of subscribers are associated with the plurality of HLRs and/or HSSs, wherein the centralized location database provides the location information regardless of which HLR or HSS among the plurality of HLRs and/or HSSs is associated with the subscriber.

10. The method of claim 9 wherein at least one of the signaling message routing nodes comprises a signaling transfer point (STP) or a Diameter signaling router (DSR).

11. The method of claim 9 wherein the received signaling message comprises a location update message.

12. The method of claim 11 wherein the intended destination of the received signaling message comprises an HLR or an HSS.

13. The method of claim 9 wherein storing the location information related to the subscriber in a centralized location database comprises storing the information in a database co-located with or hosted by one of the signaling message routing nodes.

14. The method of claim 9 wherein storing the location information related to the subscriber in a centralized location database comprises sending the information to a database that is not co-located with or hosted by one of the signaling message routing nodes.

15. The method of claim 9 wherein the location information related to a subscriber comprises at least one of:
a geographical location of the subscriber's user equipment; and
an identity or geographical location of a node providing network access to the subscriber's user equipment.

16. The method of claim 9 wherein the request for location information associated with a subscriber is sent by a mobile switching center (MSC) or a call/session control function (CSCF).

17. A non-transitory computer readable medium having stored thereon executable instructions that when executed by the processor of a computer control the computer to perform steps comprising:

at a signaling message routing node in a telecommunications network, wherein the signaling message routing node is configured to route messages to one or more of a plurality of home location registers (HLRs) and/or home subscriber servers (HSSs): receiving a signaling message having an intended destination, the message including location information related to a subscriber, and, in response to receiving the signaling message, extracting the location information related to the subscriber, routing the signaling message to the intended destination, and storing the location information related to the subscriber in a centralized location database;

at the centralized location database: receiving a request for location information associated with a subscriber, and, in response to receiving the request, retrieving the location information associated with the subscriber from the database and providing the retrieved location information in response to the request, wherein the centralized location database receives location information related to a plurality of subscribers in the network and from a plurality of signaling message routing nodes, wherein the plurality of subscribers are associated with the plurality of HLRs and/or HSSs, wherein the centralized location database provides the retrieved location information regardless of which HLR or HSS among the plurality of HLRs and/or HSSs is associated with the subscriber.

* * * * *